United States Patent
Ganguli et al.

(10) Patent No.: US 8,075,794 B2
(45) Date of Patent: Dec. 13, 2011

(54) MAGNETIC GRAPHITE NANOPLATELETS

(75) Inventors: Rahul Ganguli, Agoura Hills, CA (US); Julia J. Mack, Encino, CA (US); Vivek Mehrotra, Simi Valley, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 740 days.

(21) Appl. No.: 12/166,170

(22) Filed: Jul. 1, 2008

(65) Prior Publication Data

US 2010/0003530 A1    Jan. 7, 2010

(51) Int. Cl.
*H01F 1/28* (2006.01)
*H01F 1/20* (2006.01)
*C01B 31/04* (2006.01)

(52) U.S. Cl. .......... 252/62.55; 252/62.51 R; 252/62.54; 252/62.53; 252/378 R; 428/457; 524/496; 524/495; 524/440; 524/431; 524/401

(58) Field of Classification Search .............. 252/62.55, 252/62.51 R, 378 R, 62, 54, 62.53; 428/457; 524/496, 495, 440, 431, 401
See application file for complete search history.

(56) References Cited

U.S. PATENT DOCUMENTS 7,105,108 B2 *  9/2006  Kaschak et al. .......... 252/378 R
2008/0145647 A1  6/2008  Ganguli et al.

OTHER PUBLICATIONS

Chen et al, "Preparation and Surface Characterization of Highly Ordered Polymer/Graphite Nanosheet Composites", Mat'l and Manufact. Proceses, vol. 22, issue 6, pp. 733-736, Jun. 2007.*
Chen et al, Preparation and Characterization of graphite nanosheets from ultasonic powdering technique, Carbon, 42, 2004, pp. 753-759.*

* cited by examiner

*Primary Examiner* — Carol M Koslow
(74) *Attorney, Agent, or Firm* — Glenn H. Lenzen; Husch Blackwell LLP

(57) ABSTRACT

Provided is a magnetic graphite nanoplatelet, and a method of manufacturing nanocomposites by introducing the magnetic nanoplatelets into a composite matrix. Expanded crystalline graphite, in the form of graphite nanoplatelets, is mixed with magnetic particles to adhere the particles to the nanoplatelets. The magnetic graphite nanoplatelets are combined with a composite matrix, typically a polymer, to form a nanocomposite. In the presence of an applied magnetic field, the magnetic graphite nanoplatelets orient and align consistent with the magnetic field to yield a composite having enhance mechanical, electrical and thermal properties.

18 Claims, 2 Drawing Sheets

MAGNETIC GRAPHITE NANOPLATELETS

FIELD OF THE INVENTION

This invention relates generally to graphite nanoplatelets and composites manufactured therefrom. More particularly, it relates to graphite nanoplatelets modified with metal nanoparticles to impart magnetic characteristics to the nanoplatelets.

BACKGROUND

Nanocomposites composed of polymer matrices with nanoparticle reinforcements may be used in the manufacturing of a wide range of products such as automobile components, electronic devices, and food packaging films (see e.g. Giannelis, E. P., Appl. Organometallic Chem., Vol. 12, pp. 675 (1998); and Pinnavaia, T. J., et al, Polymer Clay Nanocomposites, John Wiley & Sons, Chichester, England (2000)). Typically, nanocompsites demonstrate a higher modulus of elasticity and yield strength, as well as enhance electrical/thermal conductivity, than samples manufactured simply from the polymer-based matrix. Clay nanoparticles are often used as a reinforcing agent in the composite. However, depending on the specific application and material characteristics of interest, graphite nanoparticles may be a more attractive choice. Graphite is a very stiff material, with excellent electrical and thermal conductivity. As such, composites manufactured with graphite nanoparticles or "nanoplatelets" may be preferred for many micro-electronic and other applications.

In addition to improved modulus and mechanical strength, graphite nanoplatelets may result in composite materials with a lower percolation threshold relative to electrical conductivity and increased thermal stability. One general problem commonly associated with the incorporation of graphite into composites, however, is the relatively low thermal conductivity in the resultant composite as compared to the graphite itself. Low thermal conductivity may hinder the dissipation of heat from a device or structure made of the composite material. Reduced thermal dissipation, in turn, may cause irreversible damages to the device or structure, or alternatively a complete failure of a composite based system.

Further, while composite materials reinforced with carbon fiber generally have good in-plane properties, the out-of-plane or through-thickness properties tend to be relatively poor by comparison. Research has been conducted to improve through-thickness properties in various composites using nanoparticles of graphite and other materials. This research has included such techniques as the use of carbon nanotubes positioned between carbon fiber plies to improve through-thickness thermal conduction (see e.g. Veedu et al, Nature Publishing Group, 7 May 2006). However, the reported improvements in thermal conductivity are small (~50%), and the use of expensive nanoparticles cannot be justified.

Hence there is a need for a material and method of manufacturing to address one or more of the drawbacks identified above.

SUMMARY

The materials and methods of manufacturing herein disclosed advance the art and overcome problems articulated above by providing a nanocomposite material with aligned magnetic graphite nanoplatelets.

In particular, and by way of example only, according to an embodiment, provided is a magnetic graphite nanoplatelet, including: a plurality of expanded graphite nanoplatelets having a random orientation; and magnetic particles dispersed between, and adhered to, the plurality of graphite nanoplatelets wherein the graphite platelets with magnetic particles adhered thereto are actuated in the presence of a magnetic field. In one embodiment, the magnetic particles are ferromagnetic.

In another embodiment, provided is a method of manufacturing a nanocomposite, the method including: expanding crystalline graphite to form graphite nanoplatelets; adhering magnetic particles to the expanded graphite nanoplatelets; and mixing the expanded graphite nanoplatelets with adhered magnetic particles in a composite matrix.

In still another embodiment, provided is a nanocomposite, including: a plurality of expanded graphite nanoplatelets; magnetic particles adhered to the graphite nanoplatelets; and a composite matrix.

DETAILED DESCRIPTION

Before proceeding with the detailed description, it should be noted that the present teaching is by way of example, not by limitation. The concepts herein are not limited to use or application with one specific type of magnetic graphite nanoplatelet. Thus, although the instrumentalities described herein are for the convenience of explanation, shown and described with respect to exemplary embodiments, the principles herein may be equally applied in other types of magnetic graphite nanoplatelets.

A magnetic graphite nanoplatelet compound is disclosed. Further, a composite material with improved chemical and/or physical properties, incorporating the magnetic graphite nanoplatelet, and a method of manufacturing the same are also disclosed.

The magnetic graphite nanoplatelets may be formed by any one of a number of techniques well known in the art, and incorporated herein by reference. More specifically "exfoliated" and "expanded" graphite nanoplatelets may be formed using a process which combines intercalation and exfoliation to produce small, randomly oriented graphite nanoplatelets having an increased total surface area. In particular, the exfoliated graphite nanoplatelets generally have an aspect ratio in the range of about 100-1000, which makes them ideal candidates for enhancing mechanical/electrical/thermal properties of the host material.

Figure 1:
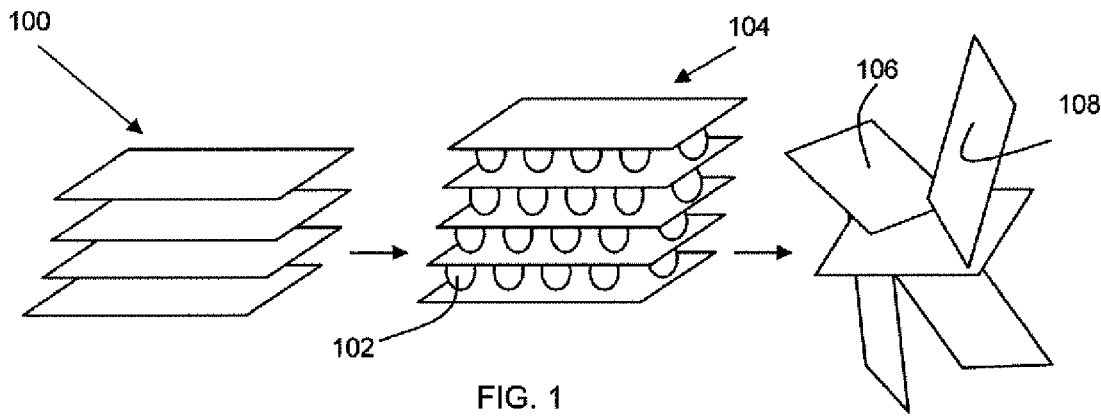
FIG. 1 is perspective view of a prior art method of manufacturing graphite nanoplatelets.

Referring now to FIG. 1, a method for manufacturing expanded graphite nanoplatelets, as discussed in the prior art and briefly summarized herein, is presented (see e.g. Mack et al, "Graphite Nanoplatelet Based Nanocomposites by the Electrospinning Process" and Yasmin et al, "Processing of expanded graphite reinforced polymer nanocomposites", Science Direct, 5 Dec. 2005). As shown, "sheets" of crystalline graphite 100 are combined with potassium 102, other alkali metals, or other intercalates to form an intercalated compound or composition 104. The particular and varied means for forming an intercalated compound of graphite are well known in the art.

Still referring to FIG. 1, the intercalated graphite compound must be exfoliated and expanded in order to form the randomly oriented, increased surface area graphite nanoplatelets. More specifically, an exfoliating agent such as pure ethanol (in the case, for example, of a potassium-based intercalate compound) may be introduced to chemically incite the exfoliation and expansion process. Exfoliation may be accomplished by mechanical stirring, sonication, or both. In yet another embodiment, an intercalated compound may be expanded by exposing the compound to thermal shock on the order of 600° C. in a furnace. Microwaves may also be used to expand the graphite through heating. The net result of the intercalation-exfoliation-expansion process is a plurality of graphite sheets or nanoplatelets, e.g. nanoplatelets 106 and 108, randomly oriented and expanded, which may have a thickness on the order of nanometers (nm) and a diameter or two-dimensional area measured in microns ($\mu$). As such, the graphite nanoplatelets have a high aspect ratio when compared to the original graphite "sheets".

As discussed above, exfoliated (expanded) graphite is a form of graphite wherein the individual platelets are separated. The exfoliated graphite usually does not have any significant order as evidenced by x-ray diffraction imaging (and represented by FIG. 1). Typical graphite nanoplatelets may be less than about 200 microns in length and less than about 0.1 microns in thickness.

Figure 2:
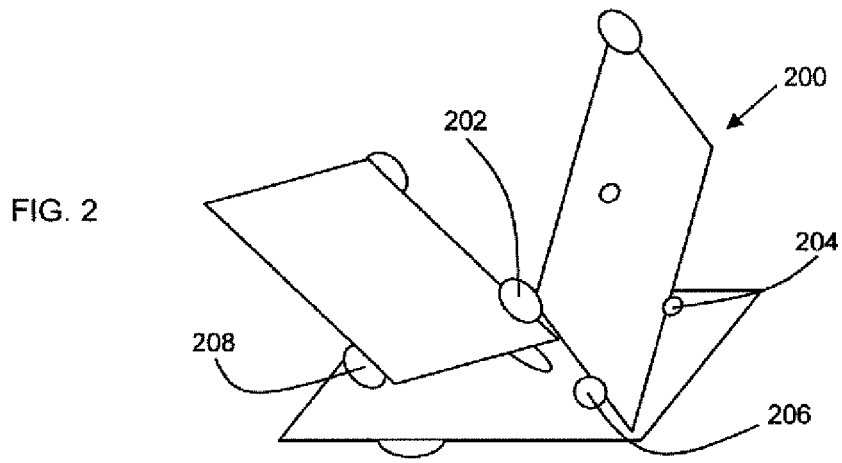
FIG. 2 is a perspective view of cryo-milled, exfoliated graphite with magnetic nanoparticles, according to an embodiment.

Referring now to FIG. 2, magnetization of the graphite nanoplatelets 200 may be achieved by mixing the exfoliated graphite with magnetic particles, e.g. particles 202, 204, 206 and 208, under conditions such that the magnetic particles 202-208 may attach or adhere to the graphite nanoplatelets 200. The magnetic particles 202-208 may infiltrate the structure of graphite platelets 200 and attach therein. Alternatively, the magnetic particles 202-208 may attach to the graphite platelets 200 through certain physical forces or chemical bonding. In at least one embodiment, the magnetic particles 202-208 may be pre-treated with chemicals to enhance their attachment to the graphite nanoplatelets 200.

Magnetic nanoparticles, e.g. particles 202-208, may be selected from a plurality of metals or alloys; however in at least one embodiment, iron is preferred because of its relative low cost, as well as its magnetic and ferromagnetic properties. For the purposes of this disclosure, "magnetic" means capable of being actuated in a magnetic field. The size of the magnetic nanoparticles may encompass a relatively broad range, and may in one or more embodiments be smaller than the size of the exfoliated graphite nanoplatelets, e.g. platelets 200. More particularly, in one embodiment the size of the magnetic particles may range from about 100 nm to about 1 nm in diameter.

In the formation of the nanocomposites disclosed herein, the magnetic graphite nanoplatelets may be mixed or otherwise introduced into a host material or composite matrix. Materials that are suitable for use as matrix material may include, but are not limited to, ceramics, glasses, metals, or polymers. In particular, in one or more embodiments, the matrix may be a thermoset or thermoplastic polymer. Examples of thermoset polymers may include epoxy, polyurethane, polyurea, polysiloxane, and alkyds, whose curing involves coupling or cross-linking reactions. Thermoplastic polymers may include polyamides, proteins, polyesters, polyethers, polyurethanes, polysiloxanes, phenol-formaldehydes, urea-formaldehydes, melamine-formaldehydes, celluloses, polysulfides, polyacetals, polyethylene oxides, polycaprolactams, polycaprolactons, polylactides, polyimides, polypropylene, nylon, polycarbonate, and polyolefins (vinyl-containing thermoplastics). In at least one embodiment, the polymer is an epoxy resin which may be cured by heating.

The graphite nanoplatelets may be dispersed in the host matrix in a uniform or non-uniform manner. In order to achieve maximum dispersion of the magnetic graphite nanoplatelets, the nanoplatelets may be driven into the host material using an external magnetic field. Alternatively, a combination of magnetic and mechanic forces may be used to facilitate the mixing of the graphite nanoplatelets in the matrix. Various forms of "mechanical" mixing may be used, to include direct mixing or stirring, sonication, shear mixing, and combinations thereof. The quantity of graphite nanoplatelets incorporated into the polymer (or other) matrix may be up to 50% by weight of the total composite. Preferably, a sufficient amount of graphite nanoplatelets is used to render the shaped, finished composite conductive. When epoxy resin is used as the host material, the composite mixture may contain less than about 10% by weight of the graphite nanoplatelets.

Figure 3:
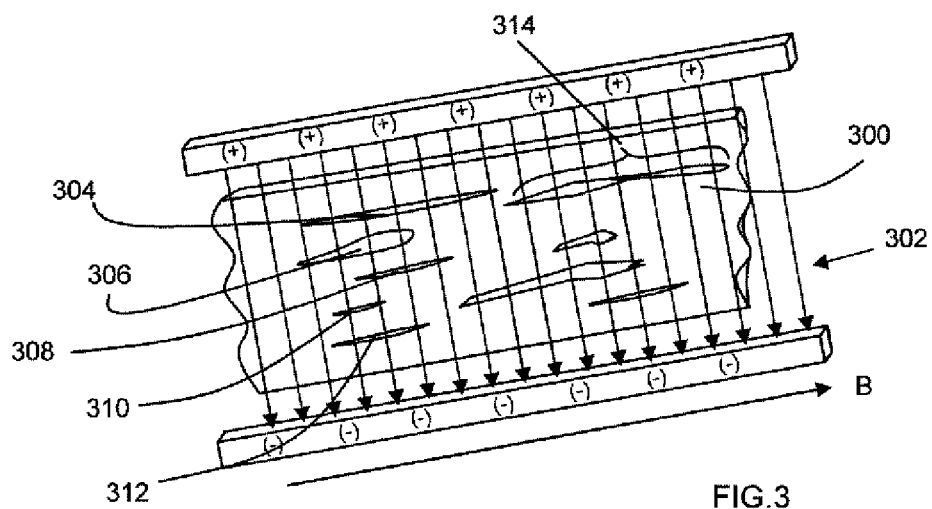
FIG. 3 is a perspective view of magnetized graphite nanoplatelets aligned within a composite matrix, in the presence of a magnetic field, according to an embodiment.

Considering now FIG. 3, once the magnetic graphite nanoplatelets have been incorporated into the host matrix, thereby forming a composite material 300, the position and orientation of the nanoplatelets may be controlled. Specifically, as shown in FIG. 3, in the presence of an electric field represented by the arrows 302, a corresponding magnetic field (B) is applied to the composite 300. As can be appreciated by those skilled in the art, the application of magnetic field (B) to composite 300 containing magnetic graphite nanoplatelets, e.g. platelets 304, 306, 308 310, and 312, will cause the platelets 304-312 to align and orient along a desired and predetermined direction consistent with the orientation of magnetic field (B). This magnetic "functionalization" of the graphite nanoplatelets may result in formation of chains of magnetic graphite platelets 314 in the host matrix.

Figure 4:
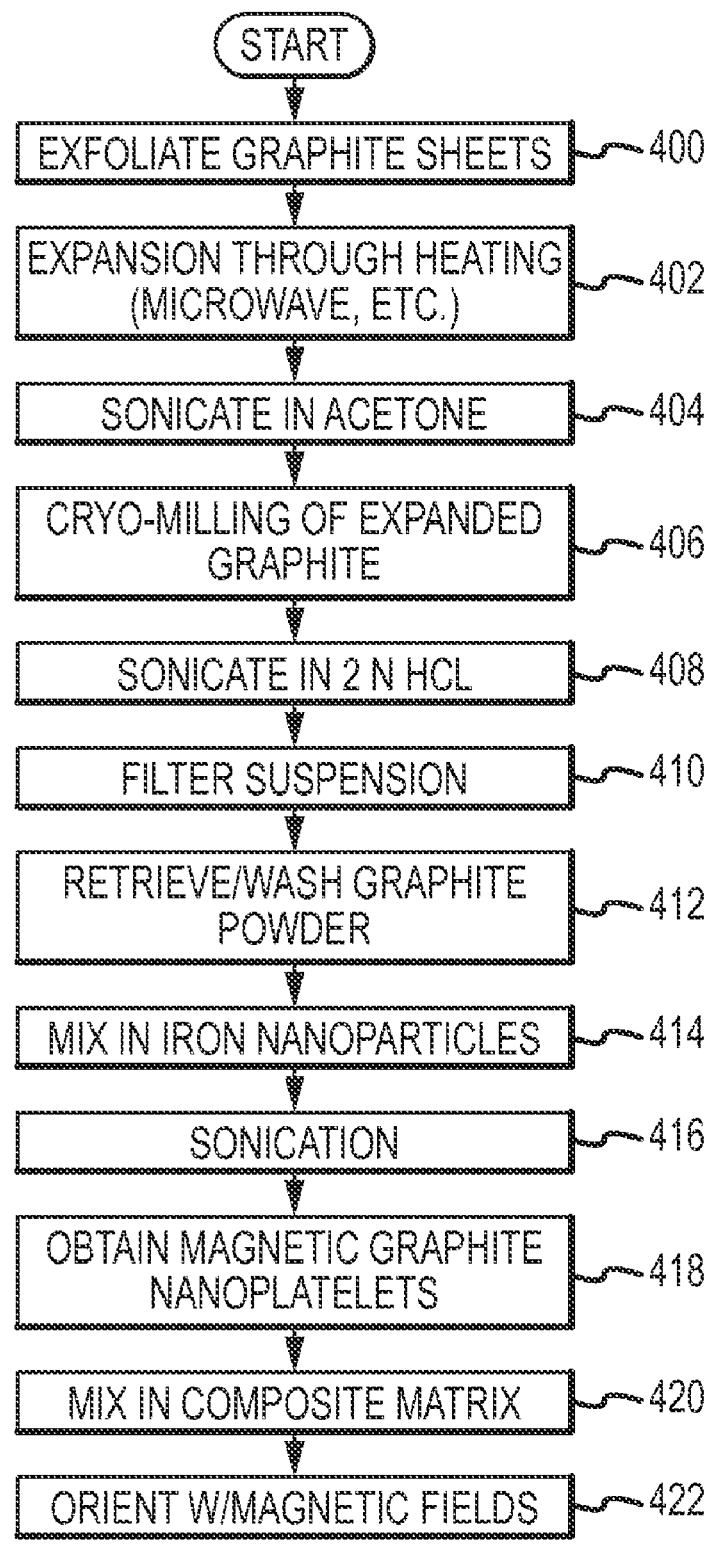
FIG. 4 is a flow chart of a method of manufacturing a magnetic graphite nanoplatelet/composite, according to an embodiment.

In FIG. 4, a method of manufacturing magnetic graphite nanoplatelets and composite materials is presented in summary form. The following examples are presented for the purpose of illustration, and are not intended to be exhaustive. The materials, chemicals, biological agents and other ingredients are presented as typical components or reactants, and the procedures described herein may represent but one of the typical ways used to accomplish the goals of the particular step or steps. It is understood that various modifications may be derived in view of the foregoing disclosure without departing from the spirit of the present disclosure.

The initial steps in the manufacturing process are the exfoliation of graphite and the formation of graphite nanoplatelets, blocks 400 and 402. In one example of the manufacturing method disclosed herein, acid intercalated graphite particles with approximately 20% acid content are exfoliated using microwave heating, block 400. The microwave heating process is adjusted such that the volume obtained after expansion, block 402, is at least 300× (more preferably 600×). After expansion of the graphite nanoplatelets, the expanded graphite is sonicated overnight in acetone, block 404.

At the completion of the sonication step, block 404, the graphite is milled, or cryo-milled, for approximately 48 hours in a mixing mill to reduce the size of individual graphite particles to less than 20 micron in diameter and 50 nm in thickness, block 406. The size-reduced graphite particles are then sonicated in 2 N HCL for approximately 2 hrs, block 408. Typically, about 40 ml of 2 N HCL is used for 500 mg of graphite particles. The suspension is then filtered using 5 micron filter paper, block 410, and the caked graphite powder is retrieved and washed, block 412.

Continuing with FIG. 4, a dispersion of iron nanoparticles (about 10 nm in diameter) in water stabilized by a positively charged surfactant head group is added to the caked powder of graphite platelets obtained as described above, block 414. Typically, about 600 ml of the iron nanoparticle dispersion is added to 500 mg of graphite powder. The mixture is sonicated for about 20 minutes, block 416, and a highly dispersed form of magnetic graphite nanoplatelets with iron particles is obtained, block 418. As disclosed above, the magnetic graphite nanoplatelets (with iron particles dispersed) are integrated or mixed with a composite matrix material to form the magnetic nanocomposite, block 420.

The magnetic graphite nanocomposite is subjected to a magnetic field of know strength and orientation, block 422, thereby yielding a composite with aligned graphite nanoplatelets and desired/enhanced mechanical, thermal and/or electrical properties. In particular, the through-thickness electrical conductivity or electrical percolation may be enhanced, as are the environmental stability, thermal conduction, and through-thickness strength and modulus. The properties of the composite may be tailored to a specific application through the control of the applied magnetic field. For example, the orientation of the magnetic graphite nanoplatelets may be specified to induce/enhance thermal conductivity in a particular direction or plane.

Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall therebetween.

What is claimed is:

1. A magnetic graphite nanoplatelet compound, comprising:
   a plurality of expanded graphite nanoplatelets having a random orientation; and
   magnetic metal particles dispersed among, and adhered to, the plurality of graphite nanoplatelets.

2. The nanoplatelets of claim 1, wherein the magnetic metal particles are ferromagnetic.

3. A magnetic graphite nanoplatelet compound comprising:
   a plurality of expanded graphite nanoplatelets having a random orientation; and
   ferromagnetic particles dispersed among, and adhered to, the plurality of graphite nanoplatelets, wherein the ferromagnetic particles are iron.

4. A nanocomposite, comprising:
   a plurality of expanded graphite nanoplatelets;
   magnetic iron particles adhered to the graphite nanoplatelets; and
   a composite matrix.

5. The nanocomposite of claim 4, wherein the composite matrix is a polymer.

6. The nanocomposite of claim 5, wherein the composite matrix is selected from a group consisting of: a thermoset and a thermoplastic.

7. The nanocomposite of claim 6, wherein the thermoset is selected from a group consisting of: epoxy; polyurethane; polyurea; polysiloxane; and alkyds.

8. The nanocomposite of claim 6, wherein the thermoplastic is selected from a group consisting of: polyamides; proteins; polyesters; polyethers; polyurethanes; polysiloxanes; phenol-formaldehydes; urea-formaldehydes; melamine-formaldehydes; celluloses; polysulfides; polyacetals; polyethylene oxides; polycaprolactams; polycaprolactons; polylactides; polyimides; polypropylene; nylon; polycarbonate; and polyolefins.

9. The nanocomposite of claim 4, wherein the percent weight of graphite nanoplatelets in the nanocomposite is 50% or less.

10. The nanocomposite of claim 4, wherein the graphite nanoplatelets having adhered magnetic particles are oriented in a predetermined direction in the presence of an applied magnetic field.

11. A method of manufacturing a nanocomposite, the method comprising:
    expanding crystalline graphite to form graphite nanoplatelets;
    adhering magnetic iron particles to the expanded graphite nanoplatelets; and
    mixing the expanded graphite nanoplatelets with adhered magnetic iron particles in a composite matrix.

12. The method of claim 11, further comprising subjecting the nanocomposite to a magnetic field to orient the graphite nanoplatelets having adhered magnetic particles.

13. A method of manufacturing a nanocomposite comprising:
    expanding crystalline graphite to form graphite nanoplatelets;
    cryo-milling the expanded graphite nanoplatelets;
    adhering magnetic particles to the expanded graphite nanoplatelets; and
    mixing the expanded graphite nanoplatelets with adhered magnetic particles in a composite matrix.

14. The method of claim 11, wherein expanding comprises:
    forming an intercalated compound with the crystalline graphite; and
    exfoliating the intercalated compound to expand the crystalline graphite.

15. The method of claim 14, wherein exfoliating comprises heating the intercalated compound to above 600° C.

16. The method of claim 11, wherein sonication is used to mix the expanded graphite nanoplatelets with adhered magnetic particles in the composite matrix.

17. The method of claim 11, wherein the composite matrix is a polymer.

18. The method of claim 17, wherein the polymer is selected from a group consisting of: a thermoset and a thermoplastic.

* * * * *